Figure 1:
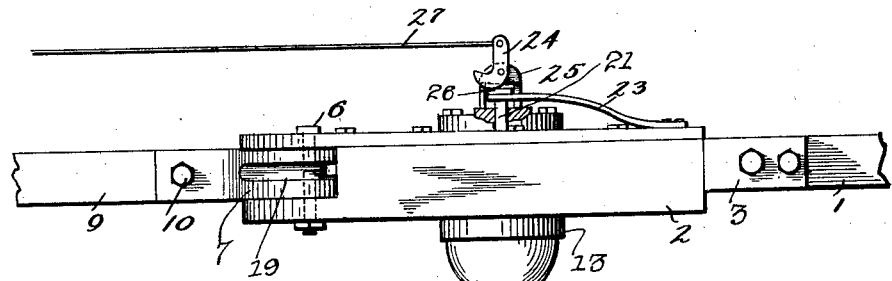

G. E. CONRAD.
STEERING MECHANISM FOR TRAILERS.
APPLICATION FILED AUG. 18, 1920.

1,385,667.

Patented July 26, 1921.
2 SHEETS—SHEET 1.

G. E. Conrad,
INVENTOR

WITNESSES

BY
ATTORNEYS

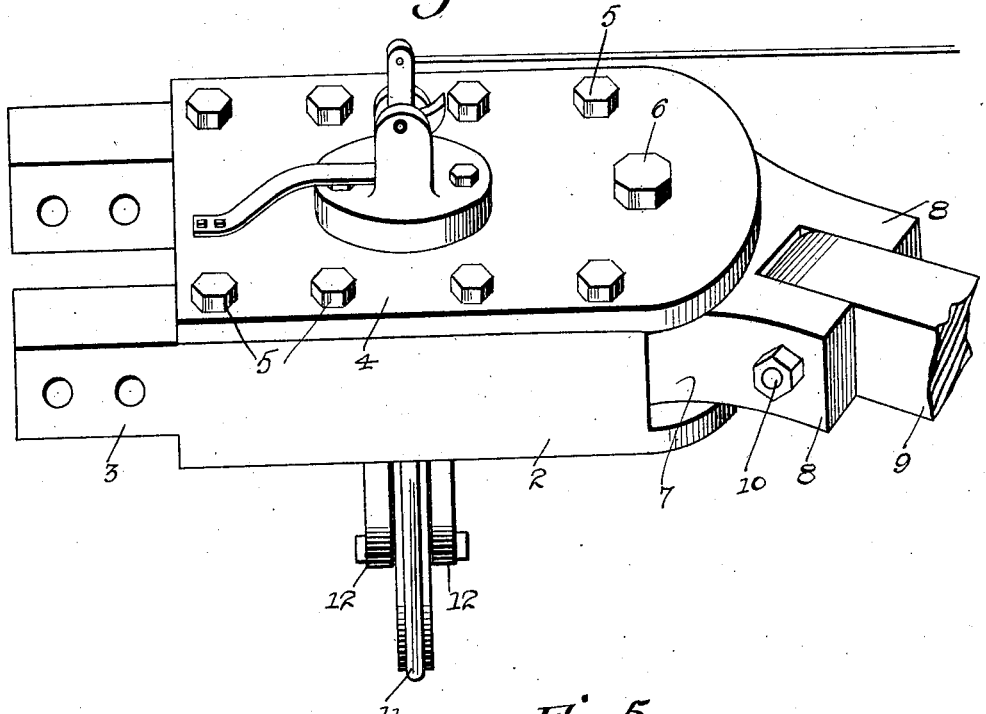

UNITED STATES PATENT OFFICE.

GEORGE EDWARD CONRAD, OF STILLWATER, MINNESOTA.

STEERING MECHANISM FOR TRAILERS.

1,385,667.   Specification of Letters Patent.   Patented July 26, 1921.

Application filed August 18, 1920. Serial No. 404,394.

*To all whom it may concern:*

Be it known that I, GEORGE EDWARD CONRAD, a citizen of the United States, and a resident of Stillwater, in the county of Washington and State of Minnesota, have invented certain new and useful Improvements in Steering Mechanism for Trailers, of which the following is a specification.

My invention is an improvement in steering mechanism for trailers, and has for its object to provide mechanism of the character specified adapted for connection with the guiding wheel of a trailer, and so arranged that the said guiding wheel will be swung by the turning of the power vehicle to constrain the trailer to follow the power vehicle, and having mechanism for locking the guiding wheel in straight position, normally releasable and operable from the power vehicle.

A further object is to provide a quick turning mechanism, wherein the connection between the power vehicle and the guiding wheel of the trailer is such that the swing through a predetermined arc of the power vehicle will swing the guiding wheel of the trailer through a multiple of this arc.

Figure 2:
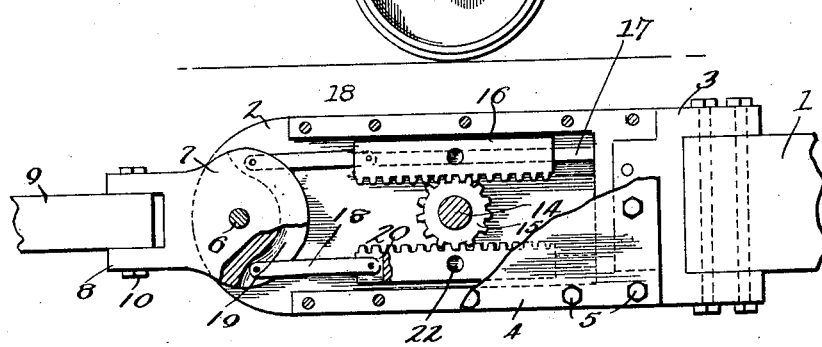
Figure 3:
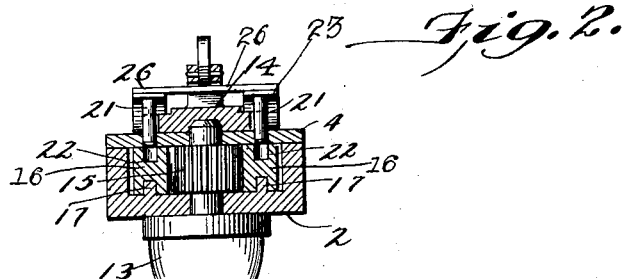

In the drawings:

Figure 1 is a side view of a portion of a trailer, showing the guiding wheel and the controlling mechanism therefor, Fig. 2 is a top plan view with parts in section, Fig. 3 is a transverse section on the axis of rotation of the steering wheel, Fig. 4 is a perspective view of the guiding wheel and its mounting, Fig. 5 is a bottom plan view.

In the present embodiment of the invention, the trailer has a forwardly extending tongue portion 1, which is connected to a frame 2 by means of a connector 3. This frame 2 is a casing, open at its top and front, and having a cover plate 4 which is secured over the open top, by means of bolts and nuts indicated at 5.

A journal pin 6 is provided at the front of the casing, the said journal pin being a bolt which is held in the casing bottom and in the cover plate 4. A head 7 is supported by the bolt, and is mounted to swing thereon. This head has a pair of forwardly extending lugs 8, which engage opposite sides of a connector or link 9 for connecting the casing to the power vehicle, a bolt indicated at 10 being passed transversely through the lugs and through the link. The pivotal connection between the link and the head is such that the link may swing vertically with respect to the head, but cannot swing laterally, and the head 7 is thus constrained to swing with the motor vehicle.

The steering or guiding wheel 11 of the trailer is journaled between the arms 12 of a fork whose body portion 13 has an upwardly extending journal pin 14 which passes through the bottom of the casing, and is provided with a pinion 15 within the casing. A pair of rack bars 16 is arranged in the casing, the bars being on opposite sides of the pinion 15 and engaging therewith, and the rack bars have guided movement longitudinally of the casing.

Each rack bar is longitudinally recessed on its underface as shown in Figs. 2 and 3, to receive a rib 17 on the casing bottom, and the rack bars are thus constrained to move in a straight line, and on lines parallel with each other. Links 18 connect the rack bars with the head 7, the head having a circumferentially extending recess 19 for receiving the ends of the link, and the rack bars have longitudinally extending recesses 20 for receiving the other ends of the links.

It will be evident that when the head 7 is swung to the right in Fig. 2, that is toward the top of the drawing, the upper rack bar will be moved rearwardly, while the lower rack bar will be moved forwardly. Thus both racks will act together to rotate the steering wheel. When the head is swung to the right, the wheel 11 will also turn toward the right, to cause the trailer to follow the vehicle, and the arrangement is such that the wheel 11 will swing double the arc through which the head 7 swings. That is if the head swings through an arc of 45°, the steering wheel will swing through an arc of 90°.

It will be evident that the relative movement of the steering wheel and the steering head may be varied to suit conditions. As for instance it may be as shown 2 to 1, or it may be 1 to 1, or 3 to 1, the relative speed being varied by varying the teeth of the pinion and rack bars.

In order to lock the steering wheel in straight position, a pin 21 is provided for each rack bar. Each pin is mounted to move through an opening in the cover 4 into engagement with an opening 22 in the rack bar. At their upper ends the pins are connected with a plate spring 23.

The pins may be simultaneously depressed to cause them to engage the rack bars by means of a cam lever 24. This lever is pivoted to a bracket 25 extending upwardly from the cover plate, and one end of the lever is in position to engage a bar 26 which extends transversely of the casing, and is connected at its ends with the free ends of the springs 23.

A link 27 connects the upper end of the cam lever with the motor vehicle, or with mechanism suitably arranged on the said motor vehicle for permitting the said lever to be operated.

It will be understood that some changes may be made in construction and arrangement of the details of my improved truck without departing from the essential features and purposes thereof, and it is my intention to cover same by this application, that is any such changes as may be within the scope of my claims.

I claim:—

1. In combination with the guiding wheel of a trailer, said wheel having a fork for supporting the same, and being journaled between the arms of the fork, a casing, the body of the fork having a journal pin extending into the casing, and provided with a pinion, a pair of rack bars having guided movement on each side of the pinion and meshing therewith, a head pivoted to the front of the casing and adapted for connection with the power vehicle, and links connecting the rack bars with the head, means for locking the rack bars from movement, springs normally pressing said locking means into inoperative position, and means operable from a distance for moving the said means into operative position.

2. In combination with the guiding caster wheel of a trailer and its support, of a casing through which said support extends and having a bearing therein, a gear wheel rigidly mounted on said support, a pair of spaced apart rack bars on opposite sides of said gear wheel and in mesh therewith, guides within the casing coacting with said racks to maintain them and the gear wheel at all times in mesh, a tongue head pivotally mounted within the front of the casing and adapted to be connected with a power vehicle, and parallel links pivotally connecting the front ends of the rack bars with the tongue head.

3. In a steering mechanism for trailers, the combination with caster wheel and its upright supporting spindle, a casing through which said spindle extends, a pinion carried by said spindle within the casing, a pair of rack bars having guided movement on opposite sides of said pinion and meshing therewith, a tongue head pivoted at the front of the casing and adapted to be connected with a power vehicle, links pivotally connecting the forward ends of the said rack bars with the tongue head, means for locking said rack bars against longitudinal movement, and means distantly controlled for operating said locking means.

4. In combination with the guiding wheel of a trailer and its support, a casing through which said support extends, a pinion carried by said support within the casing, a pair of rack bars having guided movement on opposite sides of the pinion and meshing therewith, a head pivotally mounted at the front of the casing and adapted to be connected with a power vehicle, links connecting the rack bars with said head, means for locking the rack bars against movement, said means including vertically movable bolts engaging said rack bars, springs normally forcing said bolts to inoperative position, a plate bridging said springs, a cam lever mounted to engage said plate, and means connected with said cam lever whereby the locking means may be operated from a distance.

GEORGE EDWARD CONRAD.